United States Patent [19]

Honkasalo et al.

[11] Patent Number: 5,995,496
[45] Date of Patent: Nov. 30, 1999

[54] CONTROL OF TRANSMISSION POWER IN WIRELESS PACKET DATA TRANSFER

[75] Inventors: Zhichun Honkasalo, Helsinki; Jari Hämäläinen, Tampere; Harri Jokinen, Hiisi; Richard Fehlmann, Helsinki, all of Finland

[73] Assignee: Nokia Mobile Phones Limited, Espoo, Finland

[21] Appl. No.: 08/876,677

[22] Filed: Jun. 16, 1997

[30] Foreign Application Priority Data

Jun. 17, 1996 [FI] Finland ..................................... 962510

[51] Int. Cl.$^6$ .............................. H04B 7/005; H04Q 7/30
[52] U.S. Cl. ........................... 370/318; 370/320; 370/335; 370/342; 455/69
[58] Field of Search ..................................... 370/318, 328, 370/335, 311, 342, 391, 332, 333, 320, 317, 352, 389, 353, 354, 356, 441; 455/69, 134, 126, 135, 226

[56] References Cited

U.S. PATENT DOCUMENTS

| 5,056,109 | 10/1991 | Gilhousen et al. | 370/342 |
|---|---|---|---|
| 5,257,257 | 10/1993 | Chen et al. | 370/18 |
| 5,278,992 | 1/1994 | Su et al. | 455/69 |
| 5,313,658 | 5/1994 | Nakamura | 455/69 |
| 5,349,630 | 9/1994 | Sointula | 379/58 |
| 5,450,616 | 9/1995 | Rom | 455/69 |
| 5,465,398 | 11/1995 | Flammer | 455/69 |
| 5,469,471 | 11/1995 | Wheatley, III | 375/205 |
| 5,485,486 | 1/1996 | Gilhousen et al. | 375/205 |
| 5,528,593 | 6/1996 | English et al. | 370/391 |
| 5,542,111 | 7/1996 | Ivanov et al. | 455/126 |
| 5,551,057 | 8/1996 | Mitra | 370/328 |
| 5,564,074 | 10/1996 | Juntti | 455/67.1 |
| 5,604,730 | 2/1997 | Tiedemann, Jr. | 370/335 |
| 5,715,526 | 2/1998 | Weaver, Jr. et al. | 455/126 |
| 5,822,318 | 10/1998 | Tiedemann, Jr. et al. | 370/391 |

FOREIGN PATENT DOCUMENTS

| 0 428 099 A2 | 5/1991 | European Pat. Off. . |
|---|---|---|
| 0616435 A1 | 9/1994 | European Pat. Off. . |
| 0682419 A2 | 11/1995 | European Pat. Off. . |
| 2 132 454 | 7/1984 | United Kingdom . |
| WO 93/07702 | 4/1993 | WIPO . |
| WO 95/02950 | 1/1995 | WIPO . |

OTHER PUBLICATIONS

United Kingdom Search Report.

*Primary Examiner*—Dang Ton
*Assistant Examiner*—Tuan Q Ho
*Attorney, Agent, or Firm*—Perman & Green, LLP

[57] ABSTRACT

In packet switched data transfer of the cellular radio system, the control of the transmission power comprises characteristics as well of the closed-loop control and the open-loop control. Before forming the connection and during long pauses between the packets, the terminal device measures the control signal transmitted by the base station and compares its signal power (R0) to the target level (t0), that is included by the base station in the control signal as a parameter. The base station informs in the control signal also the transmission power, whereby the terminal device sets the same power to be its transmission power, corrected by the difference between the target level and the measured quality of the link (t0-R0). In addition, also the measured quality of the link (RXQUAL) is transmitted in the acknowledgment messages of the packets, whereby the transmitting device changes its transmission power so that the quality will be controlled to the certain target level. The biggest step of the change is determined by the length of the packets. In the packet transfer downlink, the base station uses first the maximum power and corrects then its transmission power based on the measuring information included in the acknowledgment messages transmitted by the terminal device.

23 Claims, 2 Drawing Sheets

CONTROL OF TRANSMISSION POWER IN WIRELESS PACKET DATA TRANSFER

BACKGROUND OF THE INVENTION

The present invention concerns in general control of transmission power in a cellular radio network and in particular it concerns a method for controlling the transmission power, taking the special features of the packet switched links into consideration.

Cellular networks based on radio communication have become the most general form of mobile bidirectional data transfer. Links between the terminal devices and base stations are most generally circuit switched, that is, a certain transfer capacity must be totally reserved for the use of a single active data transfer link, irrespective of whether the link in question requires continuous data transfer or not. In the GSM system (Global System for Mobile Communications) dealt with as an exemplified cellular system in this application, the data transfer capacity to be reserved for one link is one traffic channel formed by one TDMA time slot (Time Division Multiple Access) being cyclically repeated as well on the transmission frequency as on the receiving frequency.

In the circuit switched data transfer one problem is formed by the sufficiency of the radio frequencies. If a certain circuit switched link requires actual data transfer only occasionally, the capacity reserved for it is for the rest of the time unnecessarily reserved. The problem is particularly clear in communications like the data calls. Data transfer in a packet form has been developed as a solution, whereby the data to be transferred is formed into separate packets that include the information on the receiver and can be transferred at unregular intervals. Between the packets the capacity used for transferring them can be addressed to be used by some other link.

For the control of the transmission power of the radio transmission, the data transfer in a packet form causes, however, problems that can't be solved by the methods known in connection with the circuit switched links. For clarifying the background of the present invention, the control of transmission power and the factors having influence on it in a known circuit switched cellular radio system are briefly described in the following.

The cellular system comprises central and controlling devices, base stations and terminal devices having radio interface with the base stations. It is preferable to set a certain power limit of the radio transmission for each base station and each terminal device. In a terminal device, the limiting of transmission power aims both at decreasing the interference to other radio links and to decreasing the power consumption of the device. Decisive factor for limiting the transmission power of the base station is the decreasing of interference. It is profitable to limit the transmission power of the transmitting radio device as small as possible, but in such a way, however, that the receiving device is able to receive the transmission without considerable errors and distortions caused by noise and interference. The limiting of power is closely connected to maintaining the quality of the radio link and different parameters indicating the quality of the received signal are generally used in it. Requirements set for the quality of the link can vary depending on what kind of information it has to be transferred in the link.

The control of the transmission power can be based on open-loop or closed-loop. In the open-loop control, where the data transfer is bidirectional, the transmitting device doesn't get any information on the quality of the arrived signal as feedback, but it makes the decision on changing the transmission power by measuring the level of the signal it has received. The workability of the method is based on the fact that the transmission and receiving frequencies are the same, whereby the path attenuation in both directions is the same or so close to one another that the path attenuations at least strongly correlate. In the closed-loop control the receiving device measures the quality of the signal that it has received and delivers a parameter describing it back to the transmitting device. The closed-loop control is a reliable method, but the receiving of the signal, the processing of the parameters that describe the quality, and the transmission of the information back to the transmitting device take time. Additionally, the closed-loop control increases the signaling effort required for the radio link.

Factors that are in connection with the power control and caused by the signal attenuation can be classified to slow and fast ones. The slow fading is caused by the changing distance between the terminal device and the base station or by roaming of the terminal device to dead spaces caused by some object or by some terrain form preventing the radio wave propagation. These factors also have influence on the uplink and downlink radio connection in the same way, and the respective time scale is of the range of several seconds. The fast fading is caused by the fact that a destructive interference of waves propagating on different paths occurs by the radio receiver, and it happens typically in less than a second. Also, the influence of the fast fading on the uplink and downlink radio connections does not correlate.

In the known closed-loop control method applied to e.g. in the GSM system, the received signal level must be measured at least during half a second, after which the delivery of the result, that is, the measuring report, uplink from the terminal device to the base station controller, takes about half a second. The base station controller typically averages the received measuring reports for about two seconds and it takes half a second again to deliver the received result to the terminal device. So, the cumulative delay will be several seconds.

In packet data transmission the radio channel is reserved for a certain transmission for about 50 ms through 5 s at a time. The closed-loop control method described above is not applicable to that kind of radio transmission, because the transmitting device has no time to receive any control message at all before the transmission is ended. Even in those cases where the control message arrives in time, the portion of the transmission with wrong power is as to the time unreasonably big.

For a man skilled in the art it is clear that it is possible to try to speed up the closed-loop control described above, by decreasing delays in a way known in the art. In addition, the averaging can be moved from the receiving device to the transmitting device, whereby, however, the need for signaling will be increased and the transmitting device made more complicated. Known from the patent publication U.S. Pat. No. 5,465,398 there is a method, wherein the receiver of a wireless local network measures the signal power from every packet received successfully, and compares it with the minimum power value it has in store, by which the receiving of the packet will be successful. The receiver sends to the transmitting device information about the difference between the received signal power and the minimum power. The transmitting device calculates a moving average from the received differences and adjusts its transmission power so that the mean value of the differences gets closer to a certain predetermined limit value.

The power control method proposed by the publication is, however, mainly applicable to continuous transmission or to circumstances where the fading of the radio signal does not change in the course of time, because the quantities calculated from the received packets are no more valid, if the time between the packets is that long that the fading effects have time to change significantly. So, the method proposed by the publication is intended for wireless local networks, where the application area is in general an office surrounding and the terminal devices are during the use almost stationary with respect to the base stations.

An object of the present invention is to provide a method by means of which a device with a wireless packet switched link is able to control its transmission power taking into consideration the special needs of the packet switched link.

The object of the present invention is achieved by merging the features of open-loop and closed-loop control, whereby the feedback information required by the closed-loop is attached to the acknowledgment packet expressing that a certain packet is successfully received, and the open-loop control is used, when this kind of acknowledgment packets are not available.

SUMMARY OF THE INVENTION

The method in accordance with the present invention is characterized in that in the first state of the transmitting device, the transmission power has a certain default value, and in the second state of the transmitting device the transmission power control is based as well on the feedback information on the quality of the data transfer link given by the acknowledgment messages of the receiving device, as on a certain default value. For the part of the terminal device, the default value is based on the measurement of the signals transmitted regularly by the base station and for the part of the base station, the default value is based on the maximum power and the time passed from the previous acknowledgment message.

In the method in accordance with the invention, a radio device transmitting only periodically evaluates, before starting the transmission and between the transmissions, what is the minimum power required for the transmission. The power determined by the evaluation is called the transmission power default value. The evaluation can be based on characteristics of the radio transmission in the reverse direction or on an assumption formed some other way about the way that the propagation conditions of the radio waves will be changed. After the transmitting device has sent a certain data packet, it receives according to the data transfer protocol being used, an acknowledgment from the receiving device, with information attached thereto by the receiving device how successful the transmission has been. The transmitting device calculates the correction of the transmission power based on the feedback included in said acknowledgment. At the same time, however, it continually evaluates also the need for transmission power, without any feedback from the receiving device. The value of the transmission power is determined by the feedback, the default value of the transmission power and the time passed from the reception of the feedback, within the limits set by certain boundary values. Thus, the method in accordance with the invention has features related with both the closed and the open-loop control.

In a cellular system the application of the invention depends on, whether the base station is concerned or the terminal device. Namely, in the known solutions the base station transmits continuously or at least very regularly certain control messages, whereby the terminal device can follow, based on the control messages received by it, the changing of the propagation conditions of the radio waves and update the default value of the transmission power maintained by it. The base station can't use exactly the same kind of a method, because the terminal devices are not transmitting continuously. The power control of the transmission in a packet form, effected occasionally in the base station, must be made numerically, e.g. so that the default value is—within certain boundary values—the bigger the longer the time is that has passed from the transmission of the previous packet.

BRIEF DESCRIPTION OF THE DRAWINGS

In the following, the invention will be described in more detail with reference to the proposed preferred embodiments and enclosed drawings, wherein.

DESCRIPTION OF THE PREFERRED EMBODIMENTS

The invention is intended to be applied to a cellular radio system, in which there is reserved the possibility at least for the terminal device (e.g. a mobile phone) and preferably also for the base station to control the transmission power in connection with the data transfer in a packet form. The available power range is limited by certain maximum and minimum values and a principle object is to adjust the power each time to be as low as possible, in a way, however, that the quality of the link achieves a certain required standard. In this application, the GSM system is dealt with as an exemplified cellular system, the GPRS packet protocol (Global Packet Radio Service) being planned as an extension thereto. The appreviations and special terms related to the GSM and GPRS are, however, not meant to be restrictive from the point of view of the invention.

According to the proposals concerning the GPRS, the packet data channels are separated to Master and Slave channels. The MPDCH channels (Master Packet Data CHannel) include two separate logical channel types that are the PCCCH (Packet Common Control CHannel) and the PBCCH (Packet Broadcast Control CHannel). On the last of these two, the base station transmits regularly certain broadcast type control signals. In the case that there is no free MPDCH channel in a certain cell, the control messages that belong to the packet links must be transmitted along the signaling channels defined to circuit switched links. The SPDCH channels (Slave Packet Data CHannel) also include two separate channel types that are the PDTCH (Packet Data Transfer CHannel) and the PACCH (Packet Associated Control CHannel). From these two, the latter one is used for transmitting the acknowledgments associated with the received packets. The method in accordance with the present invention requires certain measuring results expressing the quality of the received signal, to be delivered as feedback to the transmitting device. The measuring results can easily be attached to the acknowledgments transmitted on the PACCH channel.

Figure 1:
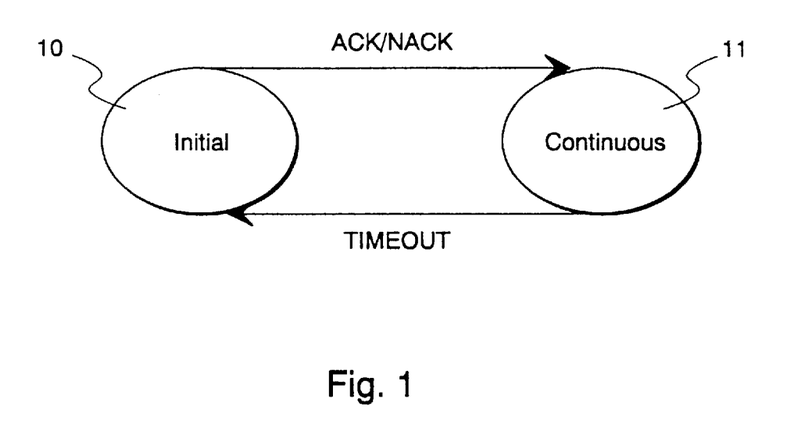
FIG. 1 illustrates as a simplified state diagram the principle of the invention.

FIG. 1 is a simplified state diagram describing the "Initial" state 10 and the "Continuous" state 11. The first mentioned of these two means a state in accordance with the present invention, in which the feedback information on the quality of the received signal is not available for the transmitting device for controlling the power, but the control of the transmission power must be based on some kind of an open-loop control. A positive or a negative feedback ACK/NACK from the receiving device makes the transmitting device to move to the "Continuous" state, in which the control of the transmission power is based at least on the information that tells how successfuil the reception of the previous transmission has been. In the "Continuous" state the transmitting device supposes that it receives regularly feedback information from the receiving device. If within a given time no feedback information is received, it returns to the "Initial" state 10 according to the arrow TIMEOUT, and the operation described by the state diagram will start from the beginning.

In the preferred embodiment of the invention, the evaluation that forms the default value of the transmission power in the "Initial" state 10, also continues when the transmitting device is in the "Continuous" state 11. In that case the value of the transmission power in the "Continuous" state is determined both according to the default value of the transmission power and according to the feedback received from the receiving device. The longer the time is that has passed from the transmission of the acknowledgment by the receiving device, the more the value of the transmission power is influenced by the open-loop type default value of the transmission power, and the less by the feedback sent by the receiving device. An eventual TIMEOUT moving back to the "Initial" state 10 happens based on the time passed from the reception of the previous feedback. If a certain predefined time has passed from reception of the previous acknowledgment, the feedback included in the acknowledgment is totally out of validity, whereby the transmitting device can be considered to have moved totally to the "Initial" state 10.

According to the invention, the "Initial" state is a state, in which no valid feedback information received from the receiving device is available for the transmitting device for controlling the transmission power. On the other hand, the "Continuous" state can be, from the point of view of the transmitting device, determined as a state, in which it transmits data as packets to the receiving device so often, that when the receiving device sends, as a response to having received a certain packet, an acknowledgment message including information about the quality of the data transfer link discovered at the reception of the packet, the time that passes from the reception of any acknowledgment message by the transmitting device until the next packet will be transmitted, is not longer than a predefined time limit. The feedback information included in a certain acknowledgment message stays valid for the mentioned predefined period.

In the following, the control of the transmission power will be dealt with first in the "Initial" state, concentrating to the part of the terminal device. The transmitting device is in the "Initial" state, when the data transfer link is not yet active or there has been a lengthy pause between the packets to be transferred on the link. The terminal device measures regularly (e.g. every two seconds or from every received frame), what is the signal power received by it on the BCCH channel (Broadcast Control CHannel) or on the PBCCH channel (Packet Broadcast Control CHannel) that belongs to the packet protocol or on some other corresponding signaling channel, on which the base station transmits regularly data associated with the radio communication. The regular reception does not set any new requirements to the operation of the terminal device, because it must supervise the BCCH signal and/or the PBCCH signal anyway, for the case that it must perform a handover.

The base station knows what would be the minimum signal power (on the dB scale) that it should receive from the terminal device when the terminal device starts to transmit packets, so that the quality standard of the received signal on the base station would be acceptable. The base station has, most preferably, determined several different levels of receiving power, the smallest thereof being the so called sensitivity level. As the power level required by the base station for the reception can vary according to the circumstances, it includes, in the preferred embodiment of he invention, into the data frames to be transmitted on the BCCH channel and/or PBCCH channel information about the power level required by it each time. If there are e.g. eight levels, they can be described by one integral number T0, referred here to as target level, the value 0 indicating that the base station is satisfied with reception on the sensitivity level, value 1 corresponding one level above the sensitivity level and so forth; value 7 means the highest level.

For determining the target level, the base station must consider that the link budget to be calculated for the radio link can be different downlink (from the base station to the terminal device) and uplink (from the terminal device to the base station). The difference between the link budgets can be taken into account at the value T0 of the target level as follows. Let us assume that it is advantageous for the base station to receive on level T0=2, which is two levels above the sensitivity level. Let us further assume that the link budget calculation or the measurements performed based on the real traffic indicates that when the terminal device is informed about a certain target level, the quality level in the base station reception will be in the reality by two levels lower. So, if the base station would inform the terminal device that the target level is T0=2, the quality level of the next packet to be transmitted by the terminal device would be T0=0 in the base station, which is the sensitivity level. In that case the base station takes the effect of the link budget into consideration by informing the terminal device that the target level is T0=4. The same principle is naturally applicable to arbitrary values of the target level and link budget calculations.

In the method in accordance with the present invention, the terminal device also needs to know what is the transmission power of the base station on the BCCH channel and/or on the PBCCH charmel. In case the value of the transmission power is not constant in every base station of the system, each base station preferably attaches to every data frame transmitted on the BCCH channel the parameter SB indicating the transmission power in dBm units. The absolute information on the transmission power of the base station can be replaced so that the terminal device supposes that every base station uses a known nominal standard power level and the difference between the real power levels is taken into consideration in the parameter T0 that determines the target level. If the base station wants that the target level is e.g. T0=2, but its own transmission power is by one target level unit higher, it transmits the target level parameter T0=3. Then the terminal device sets its own transmission power so that it corresponds to the real attenuation of the link. The terminal device sees in the reception a higher signal level than if the base station would transmit with the nominal standard power, whereby the higher level of the received signal would lead in the tenninal device to a lower transmission power than needed. The value of the target level parameter T0 by one unit higher corrects the situation. In this way the need to transmit two separate parameters will be avoided.

After the terminal device has received data frames on the BCCH channel and/or on the PBCCH channel, it measures the received signal power as per frame and by decoding finds out the values of the T0 and SB parameters included in the frame. In one alternative embodiment of the invention, the terminal device can measure the C/I ratio of the received signal (Carrier over Interference ratio) and describe the C/I ratio as power levels in the reception in the way determined by standard GSM 05.08. The frame time is typically very short (in the GSM system 4,615 ms), so that it is profitable to compensate the changes caused by the fast fading and sudden disturbances so that the terminal device averages the measurements per frame for the duration of several frames. A typical averaging time ti is the so called multiframe time that lasts several hundreds of milliseconds. To avoid a too strong influence of the slow fading on the measurement, the averaging time is, however, shorter than one second. In the following, the averaged signal power received will be marked with R0. The terminal device changes the T0 parameter into dB units in a way that is reversed the way in which the base station forms the T0 parameter and in which the effect of the link budgets is taken into consideration. Let us mark the T0 parameter indicated as decibels with t0. Then the default value Si(ti) calculated by the terminal device as its own transmission power is $$Si(ti)=SB+D, \quad (1)$$

where D=t0−R0

The formula (1) is naturally valid only in case that the result given by it is between the minimum and maximum values determined for the transmission power of the terminal device. The terminal device stores the value Si(ti) into its memory, so that it is available when the terminal device starts the transmission of the packet data. If the value Si(ti) given by the formula (1) is smaller than the minimum value of the transmission power of the terminal device, the terminal device saves the minimum value, and if the value Si(ti) is too big, the terminal device stores the maximum value.

In one alternative embodiment of the invention, the terminal device can in the "Initial" state correct the value of the transmission power given by the formula (1), by correction coefficients that are based e.g. on time passed from the previous "Continuous" state or on the measured C/I ratio of the BCCH channel and/or the PBCCH channel. If e.g. the C/I ratio measured by the terminal device is lower than a certain threshold value, it can increase the transmission power by one level.

Figure 2:
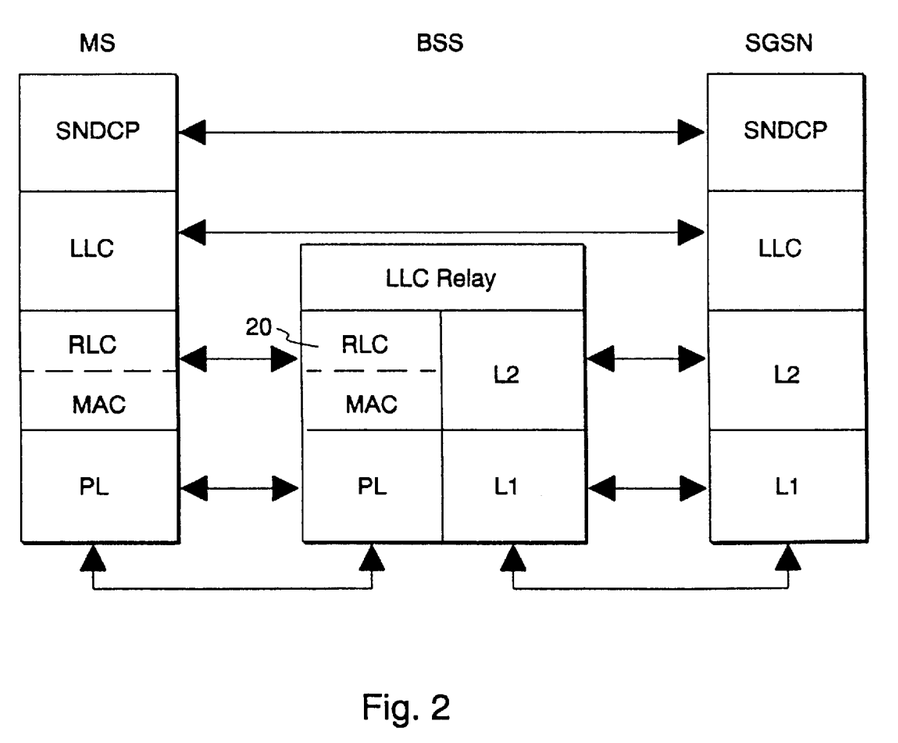
FIG. 2 illustrates known protocol stacks in the GPRS system.

In the following, a power control algorithm in accordance with the present invention will be described in the terminal device during the "Continuous" state. One packet is divided in the transmission into several blocks that are further divided into bursts. According to the OSI model (Open Structured Interface) that models the packet radio connection, the certain RLC protocol layer (Radio Link Control), on the side of the data transfer network, marked with 20 in FIG. 2, sends an acknowledgment concerning each packet that is transmitted as a whole. As the length of the packets can vary from four bursts to several hundreds of bursts, the time that it takes to transmit one packet can be e.g. in the GPRS system 18, 46 ms at the shortest and over one second at the longest. The duration of the packet will be marked in the following by tc.

The terminal device starts the transmission by using the default power Si(ti), the calculation of which is described above. When the base station (or some other device of the data transfer network processing acknowledgments) forms the first acknowledgment, it attaches thereto information on the average quality level of the received signal from the bursts included in the packet. The acknowledgment message is preferably formed so that the base station measures the quality level from all bursts and attaches the averaged information to the packet that has been collected in the base station based on the bursts transmitted by the terminal device and that is transmitted by the base station further to the SGSN device of the network (Serving GPRS Support Node), from where the acknowledgment message with its measuring results is transmitted downlink through the base station to the terminal device.

In an alternative embodiment of the invention, the information on the quality level of the bursts received by the base station is attached, instead of the acknowledgment messages of the RLC level, to the control messages that are transmitted by the base station to the terminal device also during the uplink transmission of long packets. This embodiment is advantageous in a situation where the average length of the packets is so long that the waiting for the acknowledgment messages of the RLC level causes too much delay for the delivery of feedback information to the terminal device. Prerequisite for this embodiment is that the multiframe structure of the transmission allows the transmission power to be changed between the frames included in a certain packet and that the necessary information can be attached to the control messages transmitted by the base station.

In the way described above, the target level t0 has been stored into the memory of the base station, said target level describing the pursued quality level of the base station r reception a s decibels. When the terminal device h as received the feedback from the base station, that is, information on the measured quality level, it calculates the difference of the target level and the measured level as decibels. Let this difference be marked with D1. If the measured quality level is higher than the target level, the difference D1 is negative, and if the quality level measured by the base station is lower than the target level, the difference D1 is positive. According to the closed-loop control, the next value of transmission power of the base station would be the numerically corrected transmission power, that is, the sum of the earlier used transmission power and D1, marked with Sc(tc). In other words, the terminal device would correct t its transmission power so that the quality level received by the base station would get closer to the target level.

In the method in accordance with the invention, however, the power control of the "Continuous" state takes into consideration also the time passed between the transmission of the packets. As described above, the terminal device also updates during the "Continuous" state the open-loop type default value Si(ti) of the transmission power. The next transmission power value S(t) of the terminal device is determined by the formula taking the numerically corrected transmission power Sc(tc), the averaged time tc related to the average received quality level, the updated default value Si(ti) of the transmission power and the averaged time ti used for determination of the default value into consideration. Mathematically it can be stated that $$S(t)=f(Sc(tc),t-tc,Si(ti),t-ti) \quad (2)$$

in other words, the next transmission power value S(t) is a function f, the arguments of which are the above mentioned factors. The terminal device calculates the transmission power S(t) at an arbitrary moment t, that corresponds the moment of transmission of the next packet. If the value t of the time is big, in other words, a relatively long time has passed from the reception of the previous acknowledgment till the transmission of the next packet, the value S(t) of the transmission power preferably gets closer to the latest default value Si(ti) of the transmission power. A limitation must be natrlly attached to formula (2), according to which the value S(t) of the new transmission power must be between the minimum and maximum values determined for the terminal device. There are two kinds of minimum and maximum power limits: fixed limit values depending on the construction of the terminal device and limits per cell determined by the network that often change from one cell to another. In a very small cell the base station forbids the terminal devices on the area of the cell to transmit with a power that is higher than a certain power limit. The prohibition is transmitted to the terminal devices as signaling in a way known in the art.

On possible form of function f is a function approaching exponentially the value Si(ti)

$$S(t)=Si(ti)+(Sc(tc)-Si(ti))*e^{-\alpha(t-tc)} \quad (3)$$

wherein $\alpha$ is a positive parameter, the most suitable value of which can be found by testing.

The terminal device stores the power value S(t) into the memory and transmits the bursts that carry the blocks of the next packet by using the transmission power S(t). After having received the next acknowledgment message and when preparing to transmit the following packet, the terminal device calculates again a new power value. In an alternative embodiment, the terminal device can in the "Continuous" state take a certain number of the latest power values into consideration and not only the last one. In a further alternative, the terminal device can increase the value S(t) of the transmission power towards the highest permissible transmission power Smax, insofar, as how many times a certain frame or packet has been retransmitted already. The retransmissions are usually due to data transfer errors that can be avoided by increasing the transmission power.

If more time than a certain predetermined time limit has passed from the reception of the latest acknowledgment, the feedback information included in the acknowledgment looses its validity and it is no use for the terminal device correcting the transmission power according to the closed-loop control, because there is a great probability of a control error. In that case the next transmission power will be determined by formula 1, in other words, the terminal device has returned, according to the markings of FIG. 1, back to the "Initial" state. Mathematically this corresponds for the part of the exemplified function, that in formula (3), the term $(Sc(tc)-Si(ti))*e-\alpha(t-tc)$ is insignificantly small.

In the changes of the transmission power, it is advisable to use a certain marginal factor, which means the biggest permissible single change of the transmission power, and the size of which is e.g. 2 dB. By using the marginal factor the oscillation of the power levels is tried to be prevented. Namely, fast and big changes of the power level cause correspondingly quick changes in the so called cochannel interferences that have influence on the operation of cells located near each other on the same or adjacent frequencies. A fast and big change causes first a corrective reaction in the other, near located cell, and that corrective reaction, in turn, reflects back to the original cell as a cochannel interference, whereby the system can become unstable.

The marginal factor M can have a standard size or it can be adopted to the size of the packet to be transmitted respectively: as in the transmission of long packets acknowledgments are transmitted seldom and corresponding corrections of transmission power are seldom made, the corrections can be bigger (factor M can be bigger) than when transmitting short packets. In circuit switched GSM links the transmission power control is made in steps of 2 dB every 60 seconds on a 30 dB wide range. So, a known GSM terminal device can change power from one boundary value of the permissible range to another in about one second. If the packets to be transferred in the GPRS have the length of max. three blocks, the marginal factor M can be 2 dB. With longer packets, anyway, with the maximum length of 8 blocks, the value of M can be 4 dB and in case of extremely long packets (e.g. of 80 blocks) the marginal factor M can be as big as 30 dB.

If the data transfer network does not provide at all the quality information measured by the base station in its reception, the terminal device uses automatically only the open-loop control. With the parameters carried by the network, the time limit after which the terminal device moves from the "Continuous" state to the "Initial" state, can be set substantially to infinite, whereby the terminal device is the whole time in "Continuous" state, but the ratio between the power value calculated based on acknowledgment information and the one calculated by the open-loop principle depends on the parameters of formula (3) or some other function used for this purpose. The power level of the first transmission in the control of the pure closed-loop type can be set e.g. as the maximum power by using the maximum value of the target level T0.

The data transfer network can transmit all the parameters having effect on the power control through the base stations as transmissions of broadcast type to all terminal devices. In that case the control of the power control is kept in the network, although the running of the power control algorithm is effected in the terminal devices.

The transmission power control in accordance with the present invention has been described above in a terminal device of a cellular radio system. In the following we deal with the application of the method to the transmission power control in a base station of the cellular radio system. As stated in the description of the prior art, the power control in the base station has not as significant a meaning as in the terminal device, in which the power consumption is tried to be minimized in every possible way. The base station can not use any regular BCCH or PBCCH type transmission from the terminal device, so it can't base the open-loop control on the same algorithm as the terminal device. There are two alternatives in the method in accordance with the invention. The base station can either use the maximum power determined to it always when starting transmission of packets, or it can maintain the certain power value saved into the memory in connection to an earlier transmission of packets and use it as such or modulated by certain defaults. One default of that kind is that the longer the time is that has passed from the transmission of the previous packet, the bigger is the probability that the terminal device has moved significantly, whereby the circumstances can have changed to more disadvantageous requiring a bigger transmission power. In that case the earlier power value saved into the memory of the base station will be corrected with regular intervals bigger, until it corresponds the maximum transmission power determined for the base station.

In the closed-loop type control, the base station receives from the terminal device an acknowledgment according to the RLC level, when the terminal device has received a certain packet. The number of bursts required for the transmission of one packet ranges from four to several hundreds of bursts. The terminal includes in the acknowledgment message information on the average quality level in the bursts of the received packet. The base station system or the base station controller calculates the power value Sc(tc) in the same way as described above about the operation of the terminal device. Because the base station has not the use of an Si(ti) value of the kind as that of the terminal device, calculated based on a regularly received control signal, the base station determines the value of the next transmission power by using a suitable function, in which the value of the transmission power is at least as big as value Sc(tc) but approaches in the course of time the maximum power Smax. A man skilled in the art can easily provide several suitable functions.

Figure 3:
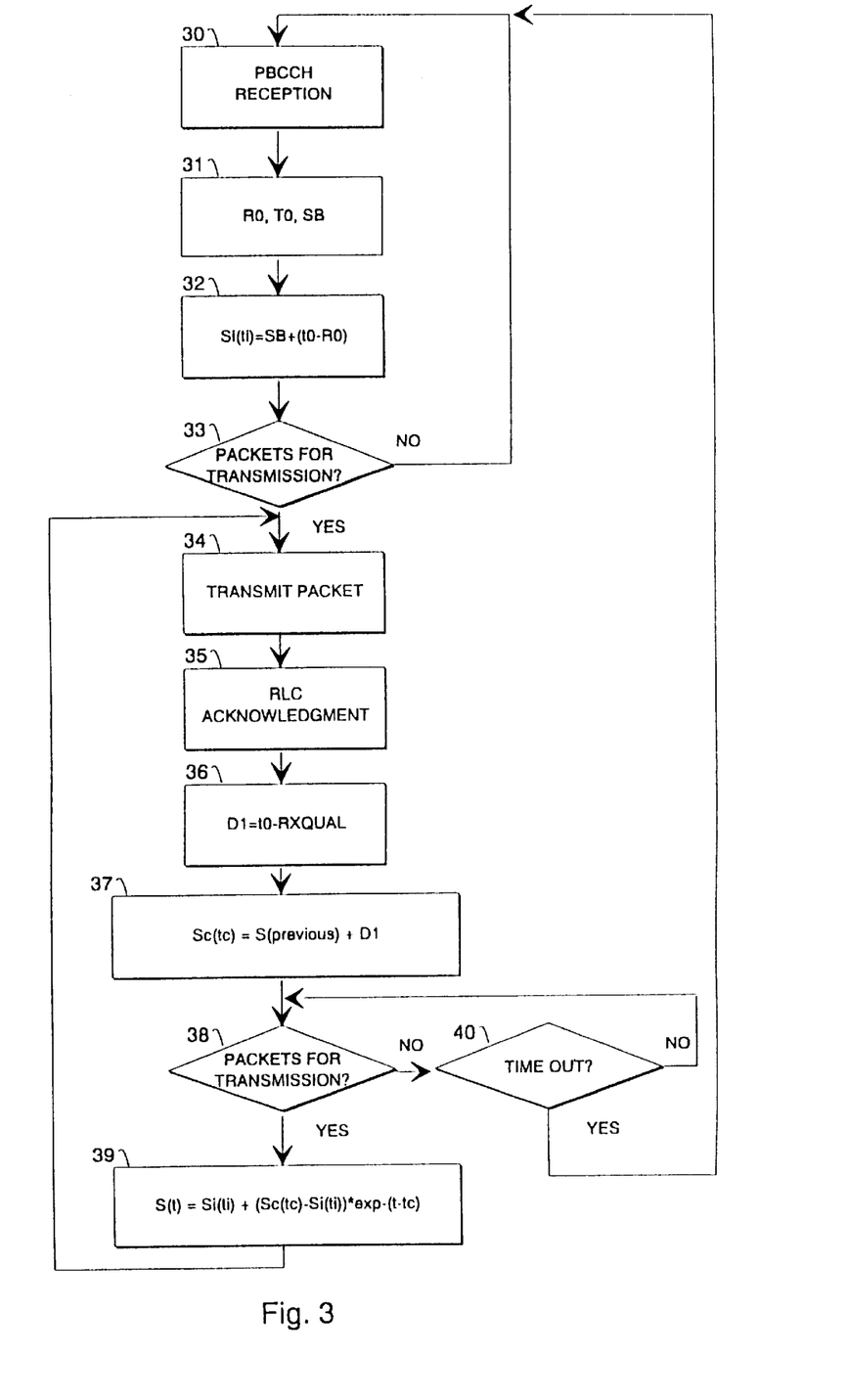
FIG. 3 illustrates as a flow diagram one preferred embodiment of the invention.

With reference to FIG. 3, there is described a method in accordance with the present invention as a simplified flow chart. The markings of the figure refer especially to the terminal device, because the determination of the value Si(ti) is described therein. Applied to the base station, value Si(ti) must be replaced by value Smax in the figure, whereby blocks 30 and 31 are unnecessary. In the "Initial" state, the terminal device circles the loop formed by blocks 30, 31, 32 and 33. After having transmitted a packet in block 34 and received the acknowledgment of the RLC level in block 35, it moves to the "Continuous" state. In blocks 36 and 37, the numerically corrected power value Sc(tc) according to the closed-loop control will be calculated. Here the measured result of the received signal quality transmitted together with the acknowledgment message has been marked with term RXQUAL. If there is a short break between the transmission of the packets, the terminal device keeps on circling around the loop formed by the blocks 38 and 40, which is broken by transmission of a new packet or if the time limit predetermined for the "Continuous" state expires. For the graphical clarity, the fact that the updating of the value Si(ti) continues also in the "Continuous" state, is not included in the flow diagram, but based on what has been stated above it should be clear that in block 39, always the latest, updated Si(ti) value will be used for calculating the transmission power.

Also the recovery from error states by increasing the transmission power can be added to the method in accordance with the present invention. In that case the device sending messages supposes automatically that if transfer of a certain packet fails, the transmission power has been insufficient and it will be corrected upwards by the biggest permissible correction step (the same as marginal factor M). In case also the channel allocation requests, that means, the so called random access messages transmitted by the terminal device prior to the actual transfer of packets, are transmitted with the power level determined by the open-loop control in accordance with the invention, also the automatic priority rating of the important channel allocation requests can be added to the method. If the terminal device must send a channel allocation request that relates e.g. to an emergency message or is otherwise especially important, it can set automatically the transmission power to be by several decibels bigger than the valid default value of the transmission power given by the formula (1).

The time limit after which the terminal device returns to the "Initial" state can also be dynamically determined e.g. so that if the transmission power has been corrected many times during one packet switched link, the time limit will be set shorter than in case the transmission power has remained the same for a long time. The same dynamical changing possibility concerns all parameters A, B, α and β of the formula (3) or, in case some other expression of function f is used instead of the formula (3), other parameters that have influence on the significance of different types of correction factors.

The present invention is of advantage compared with the prior art, because the transmitting device is always aware of the default value of the transmission power for transmitting the following packet, irrespective of how long is the time that has passed from the transmission of the previous packet, whereby the transmitting device can start the transmission immediately, when the packet to be transmitted is ready. This is a significant improvement compared with systems in which the base station must first measure the quality of the data transfer link and give to the terminal device a power control command based on the measurements, according to which the terminal device must control its transmission power to be correct before transmitting the packet. The method in accordance with the present invention connects useful features as well of the open-loop as of the closed-loop control.

We claim:

1. A method for controlling transmission power in a terminal device of a cellular radio system, a radio connection of which with a certain base station comprises an alternative first state (10) and second state (11), in the first state of which the terminal device receives (30) signals transmitted regularly by the base station and in the second state of which the terminal device additionally g transmits (34) data as packets to the base station, characterized in that in said first state the control of the default value of the transmission power in said terminal device is based on measuring (31, 32) of the signals transmitted regularly by the base station, and in said second state the control of the transmission power in said terminal device is based both on a feedback transmitted by the base station on the quality of a data transfer link (35, 36, 37, 39) and on measuring of other signals transmitted regularly by the base station.

2. A method in accordance with claim 1, characterized in that in said first state the control of the default value of the transmission power in said terminal device is based on measuring of the signal power (R0) of the signals transmitted regularly by the base station.

3. A method in accordance with claim 2, characterized in that when the transmission power (SB) with which said base station transmits said signals that it regularly transmits, and the target level (t0) of a link quality, with which it is advantageous for said base station to receive packets transmitted by said terminal device, are known by said terminal device, it corrects the default value of its transmission power to correspond to the value Si(ti) that is determined by the formula $$Si(ti)=SB+(t0-R0),$$

wherein SB is the transmission power of said base station, t0 is said target level of the link quality and R0 is the signal power measured by the terminal device in the reception of said signal.

4. A method in accordance with claim 1, characterized in that in said first state the control of the default value of the transmission power in said terminal device is based on measuring of the C/I ratio of the signals transmitted regularly by the base station.

5. A method in accordance with claim 1, characterized in that in said second state the meaning of the feedback being carried by a certain acknowledgment message transmitted by said base station and expressing the quality of the data transfer link, for the control of the transmission power of said terminal device, is the smaller the longer the time is that has passed from the reception of the feedback in question by said terminal device.

6. A method in accordance with claim 1, characterized in that the terminal device that is in said second state moves to the first state when a certain predetermined time limit from reception of the feedback on the latest transmitted packet has expired, without the terminal device having started to transmit the next packet (TIMEOUT).

7. A method in accordance with claim 6, characterized in that said predetermined time limit is the longer the more seldom the transmission power has been corrected earlier during the same packet switched radio connection.

8. A method in accordance with claim 1, characterized in that in said second state, the value of the transmission power calculated for the next packet at a certain moment follows the formula $$S(t)=Si(ti)+(Sc(tc)-Si(ti))*e^{-\alpha(t-tc)}$$

wherein Si(ti) is the default value of the transmission power calculated on the basis of the measuring of the signals transmitted regularly by the base station, ti is an averaged time used for calculating Si(ti), Sc(tc) is the transmission power calculated on the basis of the feedback transmitted by the base station, tc is an averaged time used for calculating the Sc(tc) and α is a positive parameter.

9. A method in accordance with claim 1, characterized in that when the terminal device has determined the value of a certain new transmission power, it changes its transmission power from the previous value of the transmission power towards said new value of the transmission power not more than by a certain marginal factor.

10. A method in accordance with claim 9, characterized in that said marginal factor is determined based on the size of the packets to be transmitted in the data transfer link.

11. A method in accordance with claim 10, characterized in that said marginal factor is the bigger the longer the packets to be transmitted in the data transfer link are.

12. A method in accordance with claim 1, characterized in that if said terminal device does not get in said second state any acknowledgment at all to a certain packet that it has transmitted, it increases its transmission power.

13. A method for controlling a transmission power in a base station of a cellular radio system, a radio connection of which at least with one terminal device comprises an alternative first state (10) and a second state (11), in the first state of which the base station transmits regularly control signals and in the second state of which the base station additionally transmits data as packets to a certain terminal device, characterized in that in said first state the default value of the transmission power in said base station is the same as the maximum transmission power of the base station and in said second state the control of the transmission power in said base station is based as well on the feedback of the quality of a data transfer link (35, 36, 37, 39) said feedback being transmitted by the terminal device, as on the time passed from the reception of a previous acknowledgement message by the base station from said terminal device.

14. A method in accordance with claim 13, characterized in that in said second state the meaning of a certain feedback transmitted by said terminal device and indicating the quality of the data transfer link is the smaller the longer the time is that has passed from the reception of the feedback in question by said base station.

15. A method in accordance with claim 13, characterized in that the base station that is in said second state moves to the first state when a certain predefined time limit from reception of the feedback on the latest transmitted packet has expired without the base station having started to transmit the next packet (TIMEOUT).

16. A method in accordance with claim 15, characterized in that said predefined time limit is the longer the more seldom the transmission power has been corrected earlier during the same packet switched radio link.

17. A method in accordance with claim 13, characterized in that when the base station has determined the value of the certain new transmission power, it changes its transmission power from the previous value of the transmission power towards said new value of the transmission power not more than by a certain marginal factor.

18. A method in accordance with claim 17, characterized in that said marginal factor is determined based on the size of the packets to be transmitted in the data transfer link.

19. A method in accordance with claim 18, characterized in that said marginal factor is the bigger the longer the packets to be transmitted in the data transfer link are.

20. A method in accordance with any of the foregoing claims, characterized in that if said base station does not get in said second state any acknowledgement at all to a certain packet transmitted by it, it increases its transmission power.

21. A method for controlling transmission power in a terminal device of a packet switched radio communication system comprising steps of:
    a) establishing an initial state radio connection with a certain packet switched radio communication base, wherein a default value of the transmission power of the terminal device is based on a measuring of signals regularly transmitted by the base station; and
    b) switching to an alternative packet reception state radio connection with a certain packet switched radio communication base station, wherein the terminal device receives additional feedback acknowledgment data from the base station, wherein the transmission power of the terminal device is based both on feedback acknowledgment data and on a measuring of signals regularly transmitted by the base station, wherein the feedback acknowledgment data contains information on the quality and age of packets received and transmitted by the base station.

22. A method in accordance with claim 1, wherein the second state, the value of the transmission power of a terminal device of a packet switched cellular radio base station calculated at a certain moment follows the formula $$S(t)=Si(ti)+(Sc(tc)-Si(ti))*e^{-(t-tc)}$$

wherein Si(ti) is the default value of the transmission power in the terminal device calculated on the basis of a measuring of the signals regularly transmitted by the base station, ti is an averaged time used for calculating Si(ti), Sc(tc) is the transmission power calculated on the basis of a packetized feedback signal transmitted by the packet switched cellular radio base station, tc is an averaged time derived from age data associated with each packetized feedback signal and used for calculating Sc(tc) and (t−tc), and is a positive parameter.

23. A method in accordance with claim 13, wherein said alternative first state (10) and said alternative second state (11), the value of transmission power of a packet switched cellular radio base station calculated for the next packet to a certain terminal device at a certain moment, characterized in that said first state of which the packet switched cellular radio base station regularly transmits control signals and in said second state of which the packet switched cellular radio base station additionally transmits feedback data as packets to a certain terminal device, characterized in that in said first state the default value of the transmission power in said packet switched cellular radio base station is the same as the maximum transmission power of the packet switched cellular radio base station and in said second state the control of the transmission power in said packet switched cellular radio base station is based on the quality of the data transfer link (35, 36, 37, 39) derived from the feedback data, said feedback data being transmitted by the terminal device, and on the time passed from the reception of previous feedback data transmitted by the terminal device.

* * * * *